United States Patent [19]

Gilmour

[11] Patent Number: 5,078,291
[45] Date of Patent: Jan. 7, 1992

[54] REUSABLE CLOSURE DEVICE FOR BOTTLES

[75] Inventor: Alfred J. Gilmour, Waterloo, Canada

[73] Assignee: Uni-Spray Nozzles Inc., Waterloo, Canada

[21] Appl. No.: 667,230

[22] Filed: Mar. 11, 1991

[51] Int. Cl.$^5$ .............................................. B65D 45/24
[52] U.S. Cl. .................... 215/284; 215/100 A; 215/305; 220/324; 294/27.1; 294/31.2
[58] Field of Search ............... 215/284, 280, 295, 305, 215/100 A, 228; 220/318, 324; 294/27.1, 31.2

[56] References Cited

U.S. PATENT DOCUMENTS

| | | | |
|---|---|---|---|
| 769,132 | 8/1904 | Graham | 215/295 X |
| 1,734,372 | 11/1929 | Graham | 215/295 |
| 1,956,747 | 5/1934 | Richter | 215/284 X |
| 3,124,266 | 3/1964 | Morgan | 220/318 X |
| 3,185,332 | 5/1965 | Greenstein | 215/284 X |
| 3,341,047 | 9/1967 | Nauta | 215/100 A |
| 4,982,868 | 1/1991 | Robbins, III | 294/31.2 |

Primary Examiner—Stephen Marcus
Assistant Examiner—Paul A. Schwarz
Attorney, Agent, or Firm—Hoffman, Wasson & Gitler

[57] ABSTRACT

A reusable closure device which is especially intended for use on conventional 18.9 liter plastic bottles in common use for supplying bottled drinking water. The device includes a plastic cap with a replaceable resilient seal. A pair of levers are mounted on the cap for pivoting movement between a first position which allows the cap to be placed on or removed from the bottle and a second position in which cam surfaces on the proximal ends of the levers engage a groove in the neck of the bottle to press the cap down on the bottle. The levers are approximately L-shaped and legs of the levers containing their distal ends interengage in the second position to form a carrying handle. At the present time, the abovementioned bottles are provided with non-reusable heat-shrink plastic caps which are discarded by users resulting in environmental waste. The present invention eliminates this waste.

9 Claims, 4 Drawing Sheets

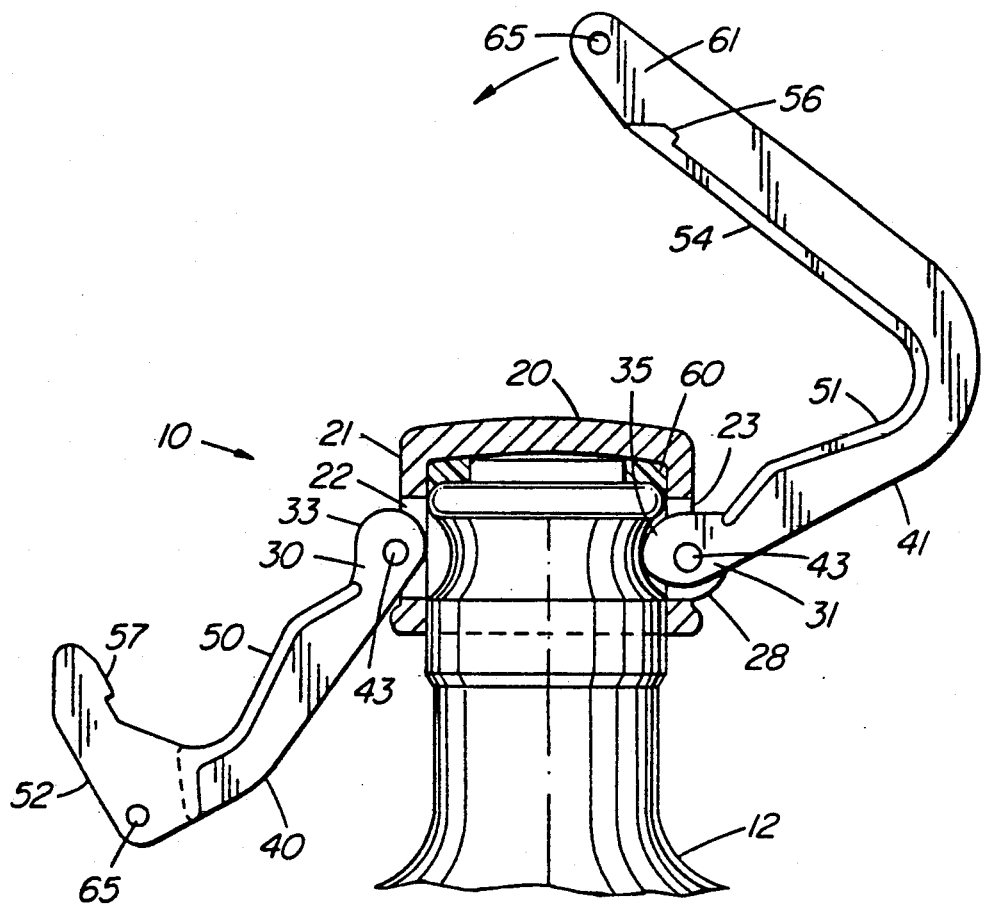

REUSABLE CLOSURE DEVICE FOR BOTTLES

BACKGROUND OF THE INVENTION

This invention relates to a closure device for a bottle of the type having a neck with a mouth and an annular groove below the mouth. Although not restricted thereto, the present invention was developed for use on 18.9 liter (5 U.S. gallon) plastic water bottles. The preferred embodiments also incorporate an integral carrying handle and means to allow the use of a tamper-resistant seal.

With the growing popularity of bottled drinking water, one of the commonest containers has become the ubiquitous 18.9 liter (5 U.S. gallon) plastic bottle used on water dispensers. According to one industry source, there are now some 36 million such bottles in North America, and these bottles are refilled on the average, about 24 times per year. Presently, the bottles are sealed after filling with a non-reusable, heat-shrink plastic cap which is discarded by the end user. This contributes about 3.9 metric tonnes of non-biodegradable solid waste to the North American environment. It is believed that such 18.9 liter plastic bottles constitute a virtual universal design used in many, if not most, countries of the world so that the aforementioned non-reusable caps would constitute, world-wide, a substantial amount of solid waste.

The existing bottles do not permit the use of a threaded closure, reusable or otherwise. Also, it would not be practical to change the design of the bottle to include a threaded mouth, due to the added problem of possible incompatibility with the dispensers, and with the problem of recycling 36 million bottles. Also, the type of moulds and production techniques presently used to manufacture the bottles cannot easily adapt to produce a threaded bottle. Lastly, if a threaded bottle could be used, it would have a shorter life than present bottles due to the added potential of thread damage in use and handling.

Another shortcoming of the existing bottle/closure is the lack of a handle or other means of lifting, carrying or moving bottles, particularly by the consumer. A full bottle weighs over 19 kg. and is an awkward shape, which poses a significant risk factor for back injuries and similar or related strains. Again, there are numerous technical and logistic reasons which tend to work against any large-scale changes in bottle design as a solution to this problem.

SUMMARY OF THE INVENTION

According to a broad aspect of the invention there is provided a closure device for a bottle of the type having a neck with a mouth and an annular groove below said mouth, said device comprising a cap adapted to fit over the neck of said bottle, said cap including a skirt portion having a pair of diametrically opposed openings and means adjacent said openings for supporting a pair of cam mechanisms, each cam mechanism including a cam surface and a lever arm, said cam mechanisms being supported for pivotal movement between a first portion in which said cam surfaces are substantially clear of said groove so that said device may be placed on or removed from said neck of said bottle and a second position in which, when said cap is on a bottle, said cam surfaces engage surface regions of said groove so as to press said device downwardly towards the mouth of said bottle.

According to another broad aspect of the invention there is provided a closure device for a bottle of the type having a neck with a mouth and an annular groove below said mouth, said device comprising a cap having cam means movable between a first position in which said cap can be placed on or removed from said neck of said bottle and a second position in which said cam means is adapted to cooperate with said groove to urge said cap downwardly towards the mouth of said bottle.

BRIEF DESCRIPTION OF THE DRAWINGS

Preferred embodiments of the invention will now be described in conjunction with the accompanying drawings, in which:

FIG. 1 is an elevational view, partly in cross-section, of a first embodiment of a closure device according to the invention, FIG. 2 is a pictorial view, from above, of the first embodiment of the closure device.

DESCRIPTION OF THE PREFERRED EMBODIMENT

Figure 3:
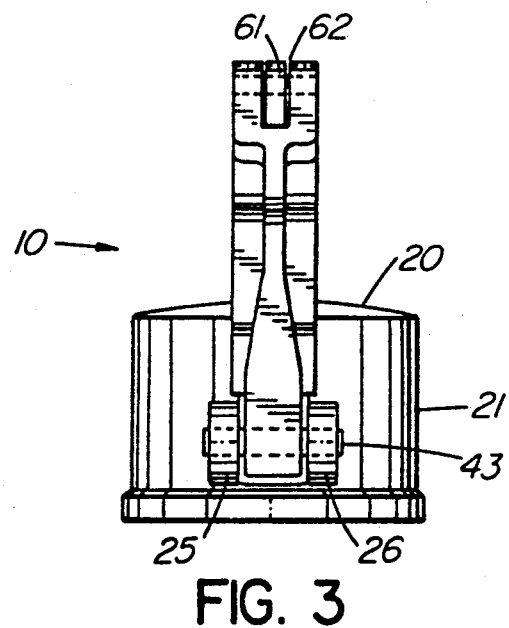
FIG. 3 is an elevational view from one end of the handle portion of the first embodiment of the closure device.
Figure 4:
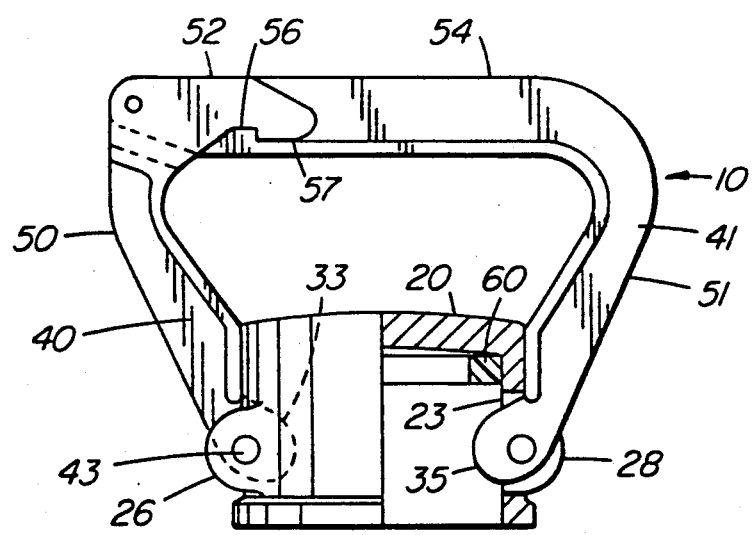
FIG. 4 is an elevational view of the first embodiment of the closure device, partly in section, and of the neck portion of a bottle on which the device is used.

Referring to FIGS. 1 to 4, and particularly FIGS. 1 and 4, a closure device according to the first embodiment of the invention, generally indicated at 10, is for use on a bottle 12 of the type having a neck 13 with a mouth 15 and an annular groove 16 below the mouth 15.

The closure device comprises a cap 20 adapted to fit over the mouth of the bottle 12. The cap includes a skirt portion 21 having a pair of diametrically opposed openings 22, 23 (FIG. 1) and bosses 25-28 adjacent the openings for supporting a pair of cam mechanisms 30, 31. The cam mechanisms include cam surfaces 33, 35 (FIGS. 1 and 4) and lever arms 40, 41. The cam mechanisms are supported on pins 43, the ends of which are retained in holes in the bosses 25-28.

The cam mechanisms 30, 31 are supported for pivotal movement between a first (open) position in which the cam surfaces are substantially clear of the groove 16 so that the closure device may be placed on or removed from the neck of the bottle 12 and a second (closed) position (FIGS. 2 to 4) in which the cam surfaces 33, 35 engage with the groove when the cap is on the bottle so as to press the closure device downwardly towards the mouth of the bottle 12. The first position is illustrated for lever arm 40 on the left side of FIG. 1. Lever arm 41 in FIG. 1 is shown at an intermediate position where the cam surface 35 is within the groove 16 of the bottle 12.

As can be seen from FIGS. 1, 2 and 4, the lever arms 40, 41 are approximately L-shaped with first leg portions 50, 51, respectively, and second leg portions 52, 54, respectively. The first leg portions 50, 51 extend from the cam surfaces 33, 35 and the second leg portions 52, 54 have latching means 56, 57 for latching the second leg portions together when the cam surfaces are in the second (closed) position (FIGS. 2, 3 and 4), whereby the latched together second leg portions form a handle for carrying the bottle 12.

A resilient annular seal 60 is disposed in the cap 20 as shown in FIGS. 1 and 4. The seal 60 may be made of neoprene, polyurethane, nitrile rubber, or other suitable materials. The seal 60 is removable and may be replaced as often as needed.

In the second or closed position the tongue-like portion 61 of the end of lever arm 41 seats in a slot 62 in the end of lever arm 40 and the latch-hooks 56, 57 are engaged. In practice, the user may have to exert a slight downward pressure on the hand-grip portion of arm 41 (leg portion 54) to allow easy engagement of the latch-hooks. However, when lifting a full bottle by means of the closed handle, upward pressure is being exerted against the hand-grip portion of lever arm 41 by the hand that is carrying it. This force serves to lock the latch-hooks together more firmly. The weight of the bottle is evenly distributed through both lever arms and via the pins 43 to the cap 20.

Where the tongue of lever arm 41 rests in the slot of lever arm 40, there are holes 65 through both lever arms such that the holes are aligned when the levers are in the fully closed position. The holes 65 permit the use of a tamper-resistant tie (not shown) to be inserted through the two levers, so that they cannot be opened and the cap removed from the bottle without removing the tie. This is to assure the consumer that the bottle has been sealed since filling, without tampering.

The first embodiment of the closure device according to the invention, described above in connection with FIGS. 1 to 4, functions entirely satisfactorily as a reusable closure device for bottles. However, when the device is secured on a bottle to seal it, the handle is in the "up" position which seriously impairs stacking of the bottles by the bottler, distributor and shipper during shipping and storage. The second embodiment, shown in FIGS. 5 to 9, avoids this problem by separating the handle from the cam mechanisms. The handle can be folded down below the top of the bottle whenever desired without affecting the cam mechanisms which secure the device on the bottle. The cam mechanisms are turned "upside down" as compared to the first embodiment so that they do not protrude above the cap when the device is closed and locked on a bottle.

Figure 5:
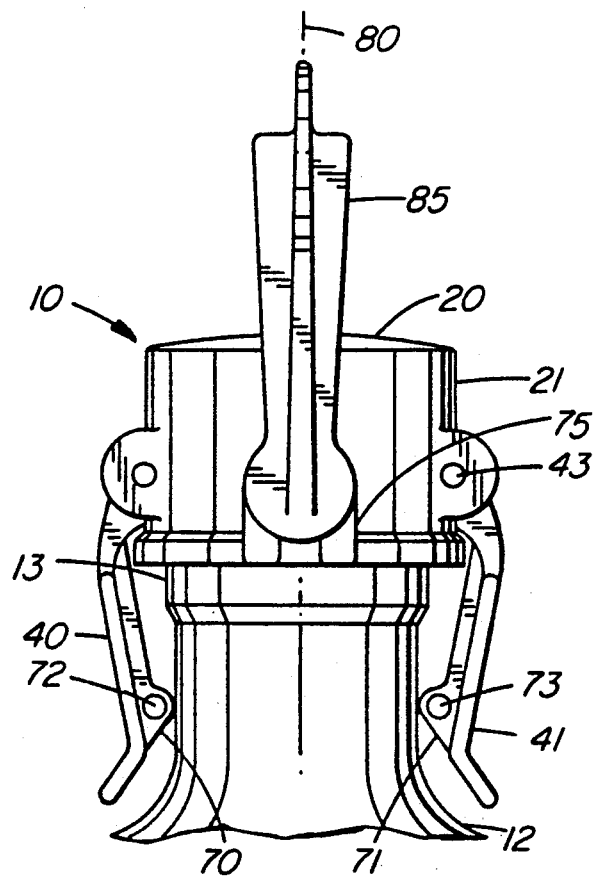
FIG. 5 is an elevational view of a second embodiment of a closure device according to the invention.
Figure 6:
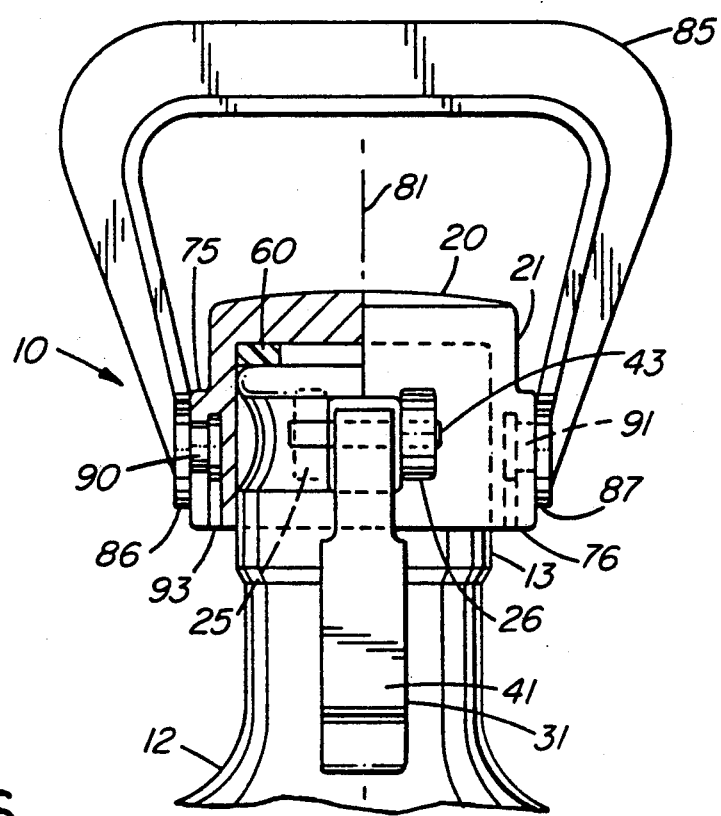
FIG. 6 is an elevational view, partly in cross-section, of the second embodiment of the invention, at right angles to the view of FIG. 5.
Figure 8:
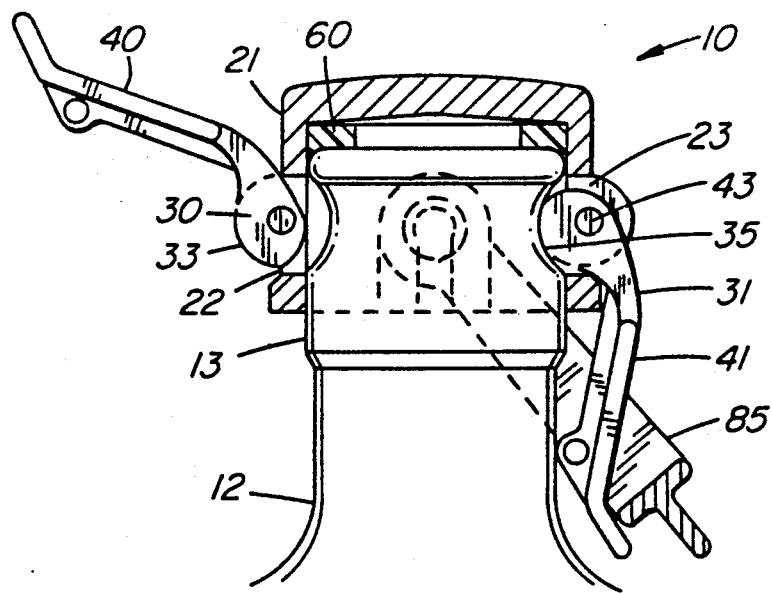
FIG. 8 is an elevational view, partly in cross-section and partly in phantom, of the closure device according to the second embodiment of the invention.

Referring to FIGS. 5, 6 and 8, a closure device according to the second embodiment of the invention, generally indicated at 10, is for use on a bottle 12 of the type best shown in FIG. 4 as having a neck 13 and an annular groove 16 below the mouth 15.

The closure device comprises a cap 20 adapted to fit over the mouth of the bottle 12. The cap includes a skirt portion 21 having a pair of diametrically opposed openings 22, 23 (FIG. 8) and bosses adjacent the openings for supporting a pair of cam mechanisms 3, 31. The cam mechanisms include cam surfaces 34, 35 (FIG. 8) and lever arms 40, 41. The cam mechanisms are supported for pivotal movement on pins 43, the ends of which are retained in holes in the bosses. This is best seen in FIG. 6 which shows cam mechanism 31, pin 43 and bosses 25, 26.

The cam mechanisms 30, 31 are pivotable on pins 43 between a first (open) position in which the cam surfaces are substantially clear of the groove 16 so that the closure device may be placed on or removed from the neck of the bottle 12 and a second (closed) position in which the cam surfaces engage with the groove 16 when the cap is on the bottle so as to press the closure device downwardly towards the mouth of the bottle 12. The first (open) position is illustrated for the cam mechanism 30 in FIG. 8 where the lever arm 40 of cam mechanism 30 is in the "up" position. Lever arm 41 of cam mechanism 31 is shown in the "down" (closed) position in FIG. 8 where the cam surface 35 is within the groove of the bottle 12.

FIG. 5 shows the lever arms 40, 41 in the "down" position and it will be seen that they have portions 70, 71 provided with holes 70, 71. A tamper-proof tie (not shown) may be secured around the bottle through the holes 70, 71 to prevent the bottle being opened without detection.

A resilient annular seal 60 is disposed in the cap 20 as shown in FIGS. 6 and 8. The seal 60 may be made of neoprene, polyurethane, nitrile rubber, or other suitable materials. The seal 60 is removable and may be replaced as often as needed.

The device shown in sized for use on a conventional 18.9 liter plastic water bottle but could be scaled up or down for use on other sized bottles.

The cap 20 may be an injection-moulded polypropylene cap or could be moulded of other suitable plastic material.

As will be apparent, the invention provides a closure device comprising a cap having cam means movable between first and second positions as described above. The cam means comprises a pair of levers 40, 41 each having a proximal end and a distal end. The proximal ends of the levers are mounted for pivotal movement between the two positions on pins 43, the ends of which are retained in bosses 25-28 on the cap 20. The proximal ends of levers 40, 41 are radially profiled with respect to axes through the pins to form cam surfaces.

Figure 7:
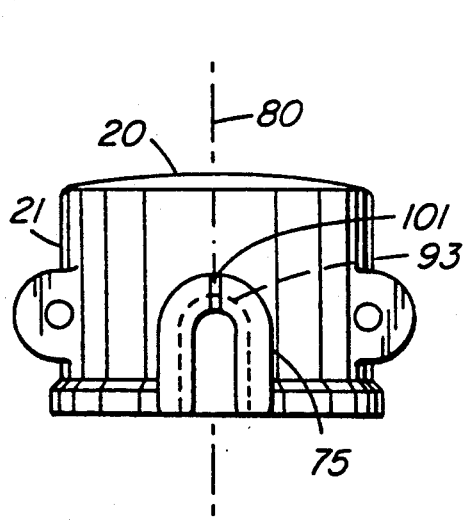
FIG. 7 is an elevational view of the cap of the second embodiment showing clearly one of the bearing members formed in the cap.
Figure 9:
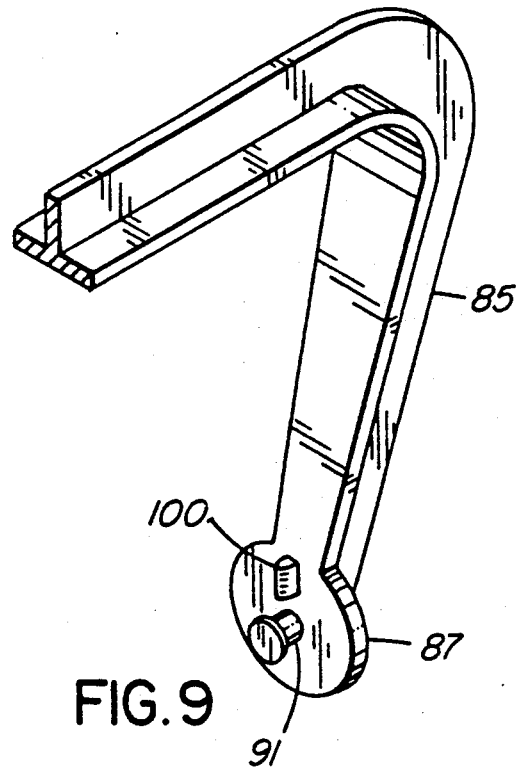
FIG. 9 is a perspective view of a portion of the handle of the closure device according to the second embodiment of the invention.

With reference to FIGS. 5, 6 and 7, it can be seen that the skirt portion 21 of the cap 20 includes first and second diametrically opposed bearing members 75 and 76 centered about a plane 80 which is substantially perpendicular to a second, central, plane through the openings 22, 23 (FIG. 8). This second plane 81 is indicated in FIG. 6; in FIGS. 5 and 7 it is coincident with the plane of the paper. The handle 85 has first and second ends 86 and 87 each having a pivot member 90, 91 slidably receivable in the bearing members 75, 76. As readily seen in FIG. 6, the pivot members 90, 91 each comprise a cylindrical portion extending from the ends 86, 87 and having a disc-shaped terminal portion. See also FIG. 9.

As shown in FIG. 7, the bearing member 75 is of substantially inverted U-shape with an internal slot 93, slot 93 also being indicated in FIG. 6. The handle is mounted on the cap by sliding the pivot members upwardly into the bearing members 75, 76 with the disc-shaped terminal portions in the slots, i.e. slot 93 of bearing member 75 and a similar slot in the other bearing member 76. The ends of the handle are prevented from being pulled away from the cap because of the engagement of the disc-shaped terminal portions in the slots.

FIGS. 5 and 6 show the handle in the "up" (carrying) position while FIG. 8 shows it in the "down" position.

It will be evident that the handle 85 is mounted on the cap 20 for pivoting movement about an axis parallel to and substantially midway between axes through the pins 43 on which the cam mechanisms are mounted whereby the handle can be moved between an upright position for carrying a bottle and either of two lowered positions.

The device is preferably provided with latch means for releasably latching the handle in an upright position. The latch means comprises a projection 100 on one or both ends of the handle (FIG. 9) and a complementarily shaped recess 101 in the bearing members (FIG. 7). The handle is sufficiently resilient that the latch means can be overcome by pushing on the handle.

If desired, the cap 20 can be modified by the addition of such features as a vent, a pressure relief valve, or a spigot to provide additional features for other applications, without departing from the invention described and claimed herein.

What I claim as my invention is:

1. A closure device for a bottle of the type having a neck with a mouth and an annular groove below said mouth;

said device comprising a cap adapted to fit over the neck of said bottle;

said cap including a skirt portion having a pair of diametrically opposed openings and means adjacent said openings for supporting a pair of cam mechanisms;

each cam mechanism including a cam surface and a lever arm;

said cam mechanisms being supported for pivotal movement between a first position in which said cam surfaces are substantially clear of said groove so that said device may be placed on, or removed from, said neck of said bottle, and a second position in which, when said cap is on a bottle, said cam surfaces engage surface regions of said groove so as to press said device downwardly towards the mouth of said bottle;

said skirt portion including first and second diametrically opposed bearing members centered about a first plane which is substantially perpendicular to a second, central, plane through said openings;

said device further comprising a handle having a first end and a second end, each said end having a pivot member slidably receivable in one of said bearing members, whereby said handle can be moved between an upright position for carrying a bottle and either of two lowered positions;

said device further comprising latch means for releasably latching said handle in said upright position; and said first and second bearing members assuming a substantially inverted U-shape with an internal slot, and said first and second pivot members each comprise a cylindrical portion extending from said ends and having a disc-shaped terminal portion receivable in said slot.

2. A device as claimed in claim 1 wherein said latch means comprises a first projection on said first end of said handle and a first recess on said first bearing member, said first recess having a shape which is complementary to the shape of said first projection, said first projection and said first recess being arranged so that said first projection is received in said first recess when said handle is in said upright position.

3. A device as claimed in claim 2 wherein said latch means further comprises a second projection on said second end of said handle and a second recess on said second bearing member, said second recess having a shape which is complementary to the shape of said second projection, said second projection and said second recess being arranged so that said second projection is received in said second recess when said handle is in said upright position.

4. A device as claimed in claim 3 wherein said first projection and said second projection are substantially identical and wherein said first recess and said second recess are substantially identical.

5. A device as claimed in claim 1 wherein said lever arms have portions which lie adjacent said neck of said bottle when said cam mechanisms are in said second position, said portions having holes for receiving a tamper-proof tie.

6. A device as claimed in claim 5 and further comprising a resilient seal disposed within said cap, said seal engaging with said mouth of said bottle when said cam surfaces are in said second position.

7. A device as claimed in claim 6 wherein said means for supporting said cam mechanisms each comprise a pivot pin extending through a hole in said cam mechanism and having end portions supported in holes in bosses disposed on opposite sides of each of said openings.

8. A device as claimed in claim 7 wherein said device is dimensioned for use on a conventional 18.9 litre plastic water bottle.

9. A device as claimed in claim 8 wherein said cap is an injection-moulded polypropylene cap.

* * * * *